A. D. BROWN.
Cotton Gin Saw.

No. 13,484.

Patented Aug. 28, 1855.

UNITED STATES PATENT OFFICE.

A. D. BROWN, OF COLUMBUS, GEORGIA, ASSIGNOR TO MARGT. L. BROWN, OF OPELIKA, ALABAMA.

IMPROVEMENT IN COTTON-GIN SAWS.

Specification forming part of Letters Patent No. 13,484, dated August 28, 1855.

*To all whom it may concern:*

Be it known that I, A. D. BROWN, of Columbus, in the county of Muscogee and State of Georgia, have invented a new and useful Improvement in Cotton-Gin Saws; and I do hereby declare that the following is a full, clear, and exact description of the same, reference being had to the accompanying drawing, forming part of this specification.

This invention consists in arranging the teeth of the saws in a series of curves eccentric to their axes, or, what is equivalent, in a series of tangential lines. By this means, with a proper arrangement of the saws relatively to each other, it is rendered impossible for any two saws to catch the same fiber across a rib, and thereby cut or break it, and a peculiar degree of facility is provided for the clearing of the saws by the brush.

Figure 1:
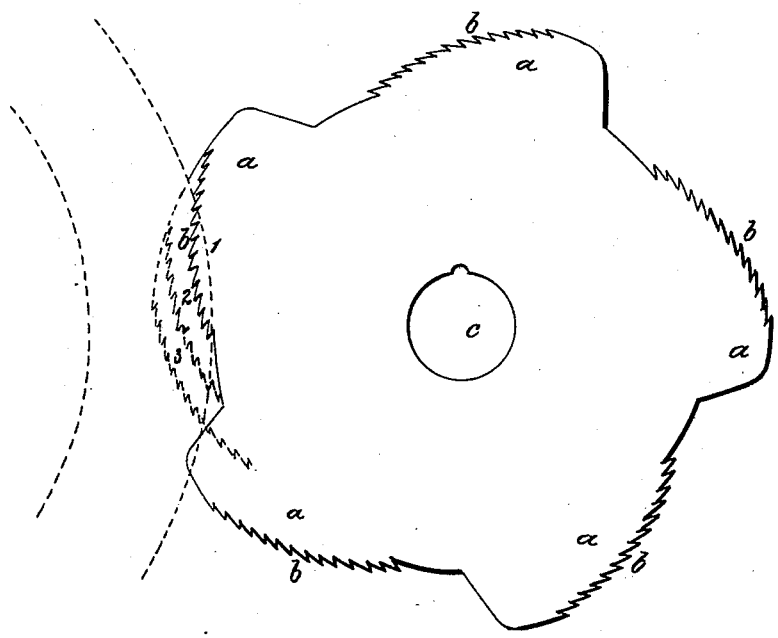

Figure 1 in the accompanying drawings is a side view of one of my improved saws, which is made with a number of lobes, $a\ a$, in order to bring the teeth into a series of curved lines, $b\ b$, eccentric to the axis $c$. The saws thus constructed are intended to be of about nine (9) inches diameter to the outer extremities of the lobes, and to be placed at the usual distance apart, and their teeth are to be of the usual size and shape. They are to be arranged in such manner that their lobes form spiral lines around the shaft, which will cause the teeth of each saw to stand either in advance or in rear of the teeth of the other saws contiguous to the same rib, and thereby the same fiber of the cotton will be prevented from being caught by two saws across a rib. The relative positions of the teeth of three saws are illustrated in Fig. 1, where the teeth of one lobe of each of two saws behind the one shown are represented by the red lines 2 and 3, the line 2 of the teeth of the second saw being in advance of the line 1 of the teeth of the nearest saw, and the line 3 of the farthest saw being in advance of the line 2. The cotton may be taken from the teeth of these saws by a brush in the usual manner, or by other suitable means. The superior facility afforded for clearing them by the brush will be explained by comparing Figs. 1 and 2.

Figure 2:
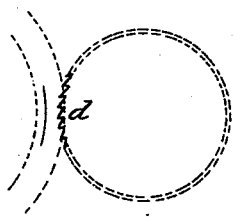

In Fig. 2, $d$ represents a common gin-saw, and the red dotted lines represent the circumference of the brush. By observing the direction of the movement of the brush in that figure it will be seen that it draws the fibers across the back of the saw-teeth and does not act in the proper direction to remove the cotton from them till it is just about to work clear of all contact with them.

In Fig. 1 parts of the circles described by the brush are represented by red dots, and it will be seen that almost as soon as the teeth meet the brush the latter acts in such a way as to draw the cotton right off them without dragging it across their backs, and this action continues as long as they are in contact.

Instead of being arranged in the eccentric curved lines $b\ b$, the teeth may be arranged in straight lines tangential to a circle described from the axis $c$. This would give the saws a form very slightly varying from that represented, and would perhaps work nearly or quite as well; but I have at present no intention of making them of that form, and have only referred to it to point out that I should consider it equivalent to the arrangement of teeth described.

The number of lobes $a\ a$ to a saw may be varied to a considerable extent, and therefore I do not in that respect place any limits upon my invention.

Having thus fully described my invention, I will proceed to state what I claim and desire to secure by Letters Patent.

I am aware that cotton-gin saws have previously been constructed in segments of circles; but I regard that as a totally different arrangement, as the teeth are all arranged in the same circle, and I do not claim any such arrangement; but

I claim—

Arranging the teeth in a series of curves, $b\ b$, eccentric to the axis of the saws, or, what is equivalent, in a series of tangential lines, substantially as and for the purposes herein set forth.

A. D. BROWN.

Witnesses:
 MICHAEL A. D. QUIN,
 JOHN ADAMS.